United States Patent
Kim et al.

(10) Patent No.: US 10,335,766 B2
(45) Date of Patent: Jul. 2, 2019

(54) SUPER ABSORBENT POLYMER AND MANUFACTURING METHOD THEREOF

(71) Applicant: LG Chem, Ltd., Seoul (KR)

(72) Inventors: Mi Young Kim, Daejeon (KR); Sang Gi Lee, Daejeon (KR); Chang Sun Han, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/035,945

(22) PCT Filed: Dec. 1, 2014

(86) PCT No.: PCT/KR2014/011620
§ 371 (c)(1),
(2) Date: May 11, 2016

(87) PCT Pub. No.: WO2015/083999
PCT Pub. Date: Jun. 11, 2015

(65) Prior Publication Data
US 2016/0288088 A1  Oct. 6, 2016

(30) Foreign Application Priority Data

Dec. 6, 2013 (KR) .................. 10-2013-0151199
Nov. 28, 2014 (KR) .................. 10-2014-0168678

(51) Int. Cl.
*B01J 20/26* (2006.01)
*B01J 20/28* (2006.01)
*B01J 20/30* (2006.01)
*B01J 20/32* (2006.01)

(52) U.S. Cl.
CPC ....... *B01J 20/261* (2013.01); *B01J 20/28016* (2013.01); *B01J 20/3021* (2013.01); *B01J 20/3078* (2013.01); *B01J 20/3085* (2013.01); *B01J 20/321* (2013.01); *B01J 20/3234* (2013.01)

(58) Field of Classification Search
CPC ........................................... B01J 20/26
See application file for complete search history.

(56) References Cited

U.S. PATENT DOCUMENTS

| | | | |
|---|---|---|---|
| 5,002,986 A | 3/1991 | Fujiura et al. | |
| 5,453,323 A | 9/1995 | Chambers et al. | |
| 5,562,646 A * | 10/1996 | Goldman ............. | A61F 13/534 428/339 |
| 5,669,894 A | 9/1997 | Goldman et al. | |
| 5,973,042 A | 10/1999 | Yoshinaga et al. | |
| 6,387,495 B1 | 5/2002 | Reeves et al. | |
| 7,884,259 B2 | 2/2011 | Hanao et al. | |
| 2002/0128618 A1 | 9/2002 | Frenz et al. | |
| 2003/0219573 A1 | 11/2003 | Falk | |
| 2005/0003191 A1 | 1/2005 | Ehrnsperger et al. | |
| 2005/0245393 A1 | 11/2005 | Herfert et al. | |
| 2007/0123658 A1 | 5/2007 | Torii et al. | |
| 2010/0063469 A1 | 3/2010 | Herfert | |
| 2010/0099781 A1 | 4/2010 | Tian et al. | |

FOREIGN PATENT DOCUMENTS

| | | |
|---|---|---|
| CA | 2433044 A1 | 7/2002 |
| CN | 1098727 A | 2/1995 |
| CN | 1642586 A | 7/2005 |
| CN | 1678356 A | 10/2005 |
| CN | 1816358 A | 8/2006 |
| CN | 1976664 A | 6/2007 |
| CN | 102197057 A | 9/2011 |
| CN | 105026033 A | 11/2015 |
| EP | 0629411 A1 | 12/1994 |
| JP | H0951912 A | 2/1997 |
| JP | 2005240252 A | 9/2005 |
| JP | 2006527641 A | 12/2006 |
| JP | 2010501696 A | 1/2010 |
| KR | 20020013850 A | 2/2002 |
| KR | 20030068198 A | 8/2003 |
| KR | 20050036975 A | 4/2005 |
| KR | 20060072148 A | 6/2006 |
| KR | 20110087293 A | 8/2011 |

OTHER PUBLICATIONS

International Search Report from PCT/KR2014/011620, dated Mar. 2, 2015.
Third Party Observation from PCT/KR2014/011620, dated Apr. 11, 2016.

* cited by examiner

*Primary Examiner* — Peter F Godenschwager
(74) *Attorney, Agent, or Firm* — Lerner, David, Littenberg, Krumholz & Mentlik, LLP

(57) ABSTRACT

The present invention relates to a super absorbent polymer and a manufacturing method thereof, and more specifically, to a super absorbent polymer having improved porosity and permeability and a manufacturing method thereof.

12 Claims, 1 Drawing Sheet

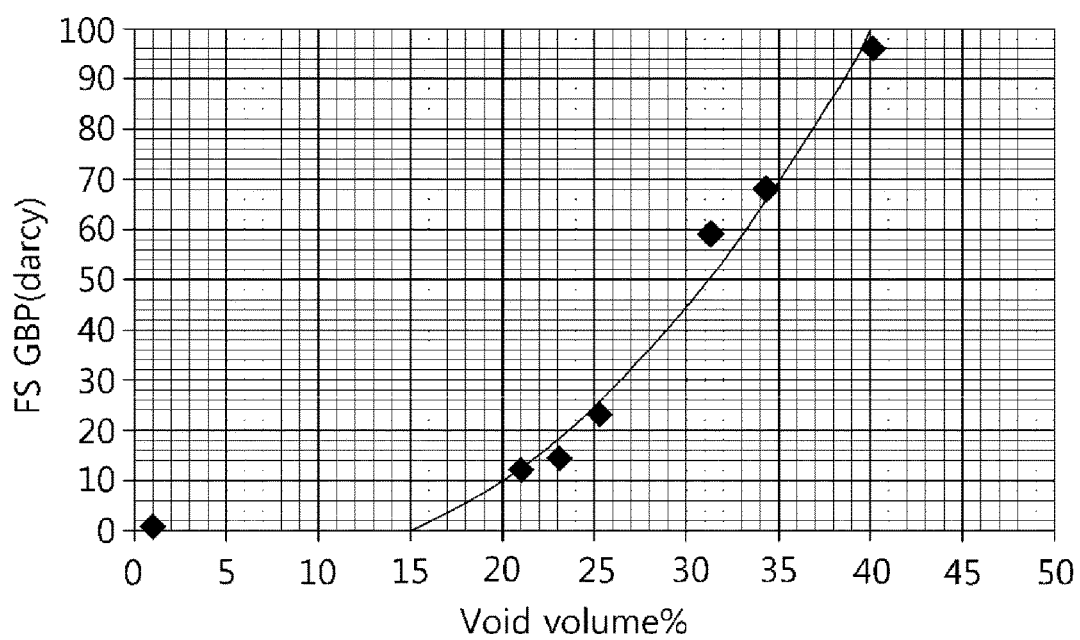

SUPER ABSORBENT POLYMER AND MANUFACTURING METHOD THEREOF

CROSS-REFERENCE TO RELATED APPLICATION

The present application is a national phase entry under 35 U.S.C. § 371 of International Application No.: PCT/KR2014/011620, filed Dec. 1, 2014, which claims priority from Korean Application Nos. 10-2013-0151199, filed Dec. 6, 2013, and 10-2014-0168678, filed Nov. 28, 2014, all of which are incorporated herein by reference.

TECHNICAL FIELD

The present invention relates to a super absorbent polymer, and a manufacturing method thereof, and more specifically, to a super absorbent polymer having improved porosity and permeability, and a manufacturing method thereof.

BACKGROUND

Super absorbent polymers (SAPs) are synthetic polymeric materials having a function capable of absorbing water about five hundred to one thousand times its own weight, and started to be practically used as sanitary equipments. Now, the super absorbent polymers have been widely used as materials for soil water retaining agent for gardening, civil engineering, building packing materials, seedling sheets, freshness preservatives in food distribution fields, fomentation, etc., in addition to hygienic goods such as paper diapers for children, etc.

In addition, as a ratio of the super absorbent polymer (SAP)/core of the diaper is increased, and the diaper becomes thin, an importance of permeability (GBP: gel bed permeability) enabling efficient diffusion of urine by the super absorbent polymer on behalf of a pulp is on the rise.

When the permeability is poor, the urine is not evenly spread in the core of the diaper, and a spread area is also decreased. Even though centrifugal retention capacity (CRC) and absorption under load (AUL) of the super absorbent polymer are high, if the urine is not well spread, many areas of the diaper may not be used, and performance of the diaper is also deteriorated.

Regarding this, various factors capable of explaining high permeability have been introduced according to the related art. As representative examples, technologies of treating a surface with silica which is a particulate or adding a polyvalent metal salt are disclosed. However, development of a super absorbent polymer simultaneously satisfying both of improvement of porosity of the super absorbent polymer and securement of excellent permeability has been demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a super absorbent polymer having advantages of improved gel strength of the super absorbent polymer, and improved porosity by coating a surface with inorganic particulates such as silica, etc., resulting in securing excellent permeability, and a manufacturing method thereof.

An exemplary embodiment of the present invention provides:
a super absorbent polymer including:
super absorbent polymer particles of which a gel strength is 5000 Pa or more; and
inorganic particles coated on a surface of the super absorbent polymer particles, wherein
i) a surface area of the inorganic particles is 90 to 380 $m^2/g$; and
ii) a content of the inorganic particles relative to total weight of the super absorbent polymer particles is 0.05 to 0.3 wt %.

Another exemplary embodiment of the present invention provides: a manufacturing method of a super absorbent polymer including:
a) preparing a hydrogel polymer by thermal polymerizing or photopolymerizing a monomer composition including a water-soluble ethylenically unsaturated monomer and a polymerization initiator;
b) drying the hydrogel polymer;
c) pulverizing the dried hydrogel polymer to obtain super absorbent polymer particles; and
d) adding and mixing inorganic particles having the following characteristics i) and ii) with the super absorbent polymer particles, and then, performing a surface coating reaction of the super absorbent polymer particles:
i) a surface area of the inorganic particles is 90 to 380 $m^2/g$; and
ii) a content of the inorganic particles relative to total weight of the super absorbent polymer particles is 0.05 to 0.3 wt %.

Yet another embodiment of the present invention provides a super absorbent polymer manufactured by the manufacturing method of a super absorbent polymer as described above.

Advantageous Effects

According to the super absorbent polymer of the present invention, gel strength of the super absorbent polymer may be improved to 5000 Pa or more, such that shapes of the packed gel particles may be more favorably maintained to form a number of voids between particles, and simultaneously, a surface of the super absorbent polymer may be coated with inorganic particulates such as silica, etc., thereby causing friction between surfaces of the gel particles, and forming a large number of voids. The improvement of the gel strength, and the surface coating of the inorganic particulates such as silica, etc., act in a multiple way, such that porosity of the super absorbent polymer of the present invention may be remarkably increased, and as a result, excellent permeability (Free Swell Gel Bed Permeability: FS GBP) may be implemented, which may improve overall physical properties.

BRIEF DESCRIPTION OF THE DRAWINGS

FIG. 1 is a graph showing a correlation between porosity and permeability (Free Swell Gel Bed Permeability: FS GBP) of super absorbent polymers manufactured by Examples and Comparative Examples of the present invention.

DETAILED DESCRIPTION OF THE EMBODIMENTS

Hereinafter, the present invention is described in detail.
A super absorbent polymer according to the present invention includes super absorbent polymer particles of which a gel strength is 5000 Pa or more; and inorganic particles coated on a surface of the super absorbent polymer particles, wherein i) a surface area of the inorganic particles is 90 to 380 m$^2$/g; and ii) a content of the inorganic particles relative to total weight of the super absorbent polymer particles is 0.05 to 0.3 wt %.

In addition, in the super absorbent polymer, the inorganic particle may be at least one selected from the group consisting of clay, aluminum sulfate, and silica, wherein the inorganic particle is preferably silica.

According to the super absorbent polymer of the present invention, gel strength of the super absorbent polymer may be improved to 5000 Pa or more, such that shapes of the packed gel particles may be more favorably maintained to form a number of voids between particles, and as a result, porosity of the super absorbent polymer may be increased.

In general, a surface of the super absorbent polymer is hydrophilic, and at the time of drying after water is absorbed, irreversible aggregation occurs by capillary force by water present between the particles, van der Waals force between particles, etc. Accordingly, water is essentially used even in polymerization and surface crosslinking processes of the super absorbent polymer, and thus, aggregation occurs, which may cause an increase in an internal load, resulting in the risk of equipment failure. Further, since the super absorbent polymer in the aggregation state as described above has a large particle size which is not appropriate for application, there is a drawback in that a shredding process of decreasing the large particle size into an appropriate particle size needs to be introduced. Further, since strong force is applied to the shredding process, physical properties may be reduced according to crushing of the super absorbent polymer.

In order to solve the above-described problems, there was an attempt to introduce various micro particles capable of being present on a surface of the super absorbent polymer, and serving to interfere with direct aggregation between resin particles. However, it is disadvantageous in that when excess of micro particles is introduced, the aggregation is prevented, but absorption characteristic of the super absorbent polymer is decreased.

In order to solve the above-described problem, the surface area of the inorganic particles introduced into the super absorbent polymer of the present invention is 90 to 380 m$^2$/g. In addition, it is preferred that the content of the inorganic particles relative to total weight of the super absorbent polymer particles is 0.05 to 0.3 wt %. When the content of the inorganic particles is less than 0.05 wt %, an effect of causing friction is not significant, such that an effect of void generation is not significant, either, and accordingly, even though gel strength is high, if porosity is below a certain level, there is a limitation in implementing high permeability. In addition, when the content of the inorganic particles is more than 0.3 wt %, physical properties such as pressurized water absorption capacity, etc., may be deteriorated. Since the super absorbent polymer of the present invention introduces the above-described inorganic particles, a large number of voids may be formed while simultaneously causing friction between surfaces of the gel particles.

The improvement of the gel strength, and the surface coating of the inorganic particulates such as silica, etc., simultaneously act in a multiple way, such that porosity of the super absorbent polymer of the present invention may be remarkably increased, and as a result, excellent permeability (Free Swell Gel Bed Permeability: FS GBP) may be implemented, which may improve overall physical properties.

The super absorbent polymer according to the present invention is manufactured by a manufacturing method of a super absorbent polymer including the following steps:

a) preparing a hydrogel polymer by thermal polymerizing or photopolymerizing a monomer composition including a water-soluble ethylenically unsaturated monomer and a polymerization initiator;

b) drying the hydrogel polymer;

c) pulverizing the dried hydrogel polymer to obtain super absorbent polymer particles; and d) adding and mixing inorganic particles having the following characteristics i) and ii) with the super absorbent polymer particles, and then, performing a surface coating reaction of the super absorbent polymer particles:

i) a surface area of the inorganic particles is 90 to 380 m$^2$/g; and ii) a content of the inorganic particles relative to total weight of the super absorbent polymer particles is 0.05 to 0.3 wt %.

For reference, as used herein, the term "super absorbent polymer particle" refers to a material in which a hydrogel polymer is dried and pulverized. More specifically, the hydrogel polymer is a material having a size of 1 cm or more in a solid jelly form including a large amount of water (50% or more) after polymerization is completed. When the hydrogel polymer is dried and pulverized into a powder form, the powdered hydrogel polymer is super absorbent polymer particle. Accordingly, the hydrogel polymer is in the intermediate state of a process.

First, the manufacturing method of the super absorbent polymer according to the present invention includes: a) preparing a hydrogel polymer by thermal polymerizing or photopolymerizing a monomer composition including a water-soluble ethylenically unsaturated monomer and a polymerization initiator.

In order to manufacture the super absorbent polymer of the present invention, the polymer may be prepared by steps and methods generally used in the art. Specifically, in manufacturing the super absorbent polymer of the present invention, the monomer composition includes the polymerization initiator, wherein according to the polymerization method, a photopolymerization initiator may be included in the case of the photopolymerization method, and a thermal polymerization initiator, etc., may be included in the case of the thermal polymerization method. Meanwhile, even if the photopolymerization method is performed, the thermal polymerization initiator may be additionally included since a predetermined amount of heat occurs by ultraviolet irradiation, etc., and in addition, as the polymerization reaction which is an exothermic reaction proceeds, some degree of heat occurs.

The thermal polymerization initiator used in the manufacturing method of the super absorbent polymer according to the present invention is not specifically limited, but preferably, may be at least one selected from the group consisting of persulfate-based initiators, azo-based initiators, hydrogen peroxide, and ascorbic acid. Specifically, examples of the persulfate-based initiator may include sodium persulfate ($Na_2S_2O_8$), potassium persulfate ($K_2S_2O_8$), ammonium persulfate (($NH_4)_2S_2O_8$), and the like, and examples of the azo-based initiator may include 2,2-azobis-(2-amidinopropane)dihydrochloride), 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride), 4,4-azobis-(4-cyanovaleric acid), etc.

In addition, the photopolymerization initiator used in the manufacturing method of the super absorbent polymer according to the present invention is not specifically limited, but preferably, may be at least one selected from the group consisting of benzoin ether, dialkyl acetophenone, hydroxyl alkylketone, phenyl glyoxylate, benzyl dimethyl ketal, acyl phosphine, and α-aminoketone. Meanwhile, specific examples of acyl phosphine may include commercially available lucirin TPO, that is, 2,4,6-trimethyl-benzoyl-trimethyl phosphine oxide.

In addition, in the manufacturing method of the super absorbent polymer according to the present invention, the water-soluble ethylenically unsaturated monomer is not specifically limited as long as it is a monomer generally used in manufacturing the super absorbent polymer, but preferably, may be at least any one selected from the group consisting of anionic monomers and salts thereof, non-ionic hydrophilic monomers, and amino group-containing unsaturated monomers and quaternary compounds thereof. Specifically, as the water-soluble ethylenically unsaturated monomer, at least any one selected from the group consisting of anionic monomers of acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methylpropane sulfonic acid and salts thereof; non-ionic hydrophilic monomers of (meth)acrylamide, N-substituted (meth)acrylate, 2-hydroxyethyl(meth)acrylate, 2-hydroxypropyl(meth)acrylate, methoxypolyethyleneglycol(meth)acrylate or polyethylene glycol(meth)acrylate; and amino group-containing unsaturated monomers of (N,N)-dimethylaminoethyl(meth)acrylate or (N,N)-dimethylaminopropyl(meth)acrylamide and quaternary compounds thereof may be preferably used. More preferably, acrylic acid or salts thereof may be used, wherein when the acrylic acid or the salts thereof are used as the monomer, a super absorbent polymer having a particularly improved absorption property may be obtained.

In addition, in the manufacturing method of the super absorbent polymer according to the present invention, for an effect by recycling of resources, the monomer composition may include a predetermined amount of fine powder in the manufactured SAP powder, that is, polymer or resin powder of which a particle size is less than 150 μm. Specifically, before and after the polymerization reaction of the monomer composition starts, the polymer or the resin powder of which a particle size is less than 150 μm may be added at early, middle, and late stages. Here, an amount possible to be added is not limited, but preferably, may be 1 to 10 parts by weight relative to 100 parts by weight of the monomer included in the monomer resin composition so as to prevent deterioration of physical properties of the finally manufactured SAP.

In the meantime, in the manufacturing method of the super absorbent polymer according to the present invention, a concentration of the water-soluble ethylenically unsaturated monomer in the monomer composition may be appropriately selected and used in consideration of a polymerization time, a reaction condition, etc., but preferably, 40 to 55 wt %. When the concentration of the water-soluble ethylenically unsaturated monomer is less than 40 wt %, it is not effective in view of economic feasibility, and when the concentration of the water-soluble ethylenically unsaturated monomer is more than 55 wt %, at the time of pulverizing the polymerized hydrogel polymer, a pulverization efficiency may be decreased.

The method of preparing the hydrogel polymer by thermal polymerizing or photopolymerizing the above-described monomer composition is not limited in view of constitution as long as it is a generally used polymerization method. Specifically, the polymerization method is largely classified into thermal polymerization and photopolymerization according to a polymerization energy source. The thermal polymerization may be generally performed in a reactor having stirring spindles such as a kneader, and the photopolymerization may be performed in a reactor provided with a movable conveyor belt. However, these polymerization methods are provided as an example, and the present invention is not limited to the above-described polymerization methods.

As an example, the hydrogel polymer obtained through thermal polymerization by supplying hot air to the reactor such as the kneader having stirring spindles as described above or by heating the reactor may have a few centimeters to a few millimeters when it is discharged from an outlet of the reactor according to the shape of the stirring spindles provided in the reactor. Specifically, the obtained hydrogel polymer may have various sizes according to the concentration of the monomer composition to be fed thereto, a feeding speed thereof, etc., and the hydrogel polymer having a particle size of 2 to 50 mm may be generally obtained.

In addition, when the photopolymerization is performed in the reactor provided with the movable conveyor belt as described above, the generally obtained hydrogel polymer may be a sheet-typed hydrogel polymer having a width of the belt. Here, the thickness of the polymer sheet may vary according to the concentration of the monomer composition to be fed thereto and the feeding speed thereof, and it is preferable to control the monomer composition to obtain the sheet-type polymer generally having a thickness of 0.5 to 5 cm. If the monomer composition is fed so that the thickness of the sheet-type polymer becomes too thin, a production efficiency becomes low, which is not preferred. If the thickness of the sheet-type polymer exceeds 5 cm, the polymerization reaction may not be uniformly generated throughout the total thickness of polymer due to the excessively thick thickness.

The gel strength refers to a stress at the moment just before the gel is destroyed when modifying the gel by applying stress, which means an elastic modulus of a pre-swollen hydrogel polymer.

In an exemplary embodiment of the present invention, an experiment was performed at room temperature to measure gel strength of a final product. In order to prepare a sample, a final product sample was mixed with brine at a predetermined mass ratio, followed by swelling. After that, extra brine was removed through aspiration, and brine remaining on a surface of the swollen sample was removed, and then gel strength was measured by using a stress type rheometer measuring equipment using a parallel plate with a diameter of 25 mm.

Then, the manufacturing method of the super absorbent polymer according to the present invention includes b) drying the hydrogel polymer.

The hydrogel polymer obtained by step a) may have typically a percentage of water content of 30 to 60 wt %. Meanwhile, the term "percentage of water content", as used herein, means a water content occupied with respect to the total weight of the hydrogel polymer, which is obtained by subtracting the weight of the dry polymer from the weight of the hydrogel polymer. (Specifically, it is defined as a value calculated by measuring a weight loss according to evaporation of water in the polymer during a drying process by raising a temperature of the polymer through infrared heating. Here, the percentage of water content is measured under drying conditions in which a temperature is raised from room temperature up to 180° C., and then the temperature is maintained at 180° C., and for a total drying time determined as 20 minutes, including 5 minutes for a temperature raising step.)

The hydrogel polymer obtained by step a) is subjected to the drying step, wherein a drying temperature in the drying step may be preferably 150° C. to 250° C. Meanwhile, the term "drying temperature" as used herein, may refer to a temperature of heating medium supplied for the drying, or a temperature of a drying reactor including heating medium and the polymer in a drying process.

When the drying temperature is less than 150° C., a drying time may be excessively increased, and physical properties of the finally formed super absorbent polymer may be deteriorated, and when the drying temperature is more than 250° C., only a surface of the polymer may be excessively dried, such that fine powder may occur in a pulverization process to be performed later and physical properties of the finally formed super absorbent polymer may be deteriorated. Preferably, the drying step may be performed at a temperature of 150° C. to 250° C., and more preferably, 160° C. to 200° C.

Meanwhile, the drying time is not limited in view of constitution, for example, may be 20 minutes to 90 minutes in consideration of a process efficiency, and the like.

In addition, the drying method of the drying step may also be selected and used without limitation in view of constitution as long as it is generally used as a drying process of the hydrogel polymer. Specifically, the drying step may be performed by hot air supply, infrared irradiation, microwave irradiation, ultraviolet irradiation, etc. The polymer after performing the drying step may have a percentage of water content of 0.1 to 10 wt %.

Meanwhile, the manufacturing method of the super absorbent polymer according to the present invention may further include a simply pulverizing step before the drying step as needed, in order to increase an efficiency of the drying step. According to the simply pulverizing step before the drying step, the hydrogel polymer may be pulverized into a particle size of 1 mm to 15 mm. When it attempts to perform the pulverization so that the particle size of the polymer is less than 1 mm, the pulverization is technically difficult to be performed since the hydrogel polymer has a high percentage of water content, and further, pulverized particles may be aggregated with each other. In addition, when it attempts to perform the pulverization so that the particle size of the polymer is more than 15 mm, an effect of increasing an efficiency of the drying step to be performed later according to the pulverization is not significant.

In the simply pulverizing step before the drying step, a pulverizer to be used is not limited in view of constitution, but specifically, may include any one selected from the pulverizing equipment group consisting of a vertical pulverizer, a turbo cutter, a turbo grinder, a rotary cutter mill, a cutter mill, a disc mill, a shred crusher, a crusher, a chopper, and a disc cutter, and the present invention is not limited to the above-described examples.

When the pulverizing step is performed to increase a drying efficiency before the drying step, the polymer may be adhered onto a surface of the pulverizer since the polymer has a high percentage of water content. Accordingly, at the time of the pulverizing step, additives capable of preventing the adhesion, etc., may be additionally used to increase the efficiency of the pulverizing step before drying the hydrogel polymer. Specifically, types of the additives to be usable are not limited in view of constitution, but may be steam, water, surfactants, anti-aggregation agents of fine particles such as inorganic powder, etc., including clay, silica, etc.; thermal polymerization initiators such as persulfate-based initiators, azo-based initiators, hydrogen peroxide and ascorbic acid, epoxy-based crosslinking agents, diol crosslinking agents, crosslinking agents including two or three or more of multifunctional groups of acrylate, crosslinking agents such as one functional group of compound including a hydroxyl group, etc., and the present invention is not limited to the above-described examples.

Then, the manufacturing method of the super absorbent polymer according to the present invention includes, after the drying step, c) pulverizing the dried hydrogel polymer to obtain super absorbent polymer particles. A particle size of the super absorbent polymer particles obtained after the pulverizing step is 150 to 850 μm. In the manufacturing method of the super absorbent polymer according to the present invention, the pulverizer used to perform the pulverization into the above-described particle size may be specifically a pin mill, a hammer mill, a screw mill, a roll mill, a disc mill, a jog mill, etc., but is not limited thereto.

Then, the manufacturing method of the super absorbent polymer according to the present invention may further include a step of classifying the pulverized super absorbent polymer particles into a particle having a particle size of less than 150 μm, a particle having a particle size of 150 μm or more to less than 300 μm, a particle having a particle size of 300 μm or more to less than 450 μm, a particle having a particle size of 450 μm or more to less than 600 μm, a particle having a particle size of 600 μm or more to 850 μm or less, and a particle having a particle size of 850 μm or more.

Then, the manufacturing method of the super absorbent polymer according to the present invention may further include: before the surface coating reaction of step d), adding and mixing a surface crosslinking agent with the super absorbent polymer particles, and then, performing a surface crosslinking reaction of the super absorbent polymer particles.

The surface crosslinking agent to be added in the manufacturing method of the super absorbent polymer according to the present invention is not limited in view of constitution as long as it is a compound that is reactable with a functional group of the polymer. In order to improve characteristics of the super absorbent polymer to be produced, the surface crosslinking agent may be preferably at least one selected from the group consisting of multifunctional acrylate-based compounds; polyvalent alcohol compounds; epoxy compounds; polyamine compounds; haloepoxy compounds; condensation products of haloepoxy compounds; oxazoline compounds; mono-, di- or polyoxazolidinone compounds; cyclic urea compounds; polyvalent metal salts; and alkylene carbonate compounds.

Specifically, the multifunctional acrylate-based compound may be at least one selected from the group consisting of polyethylene glycol diacrylate (PEGDA), 1,6-hexanediol diacrylate (HDDA), tetraethylene glycol diacrylate (TEGDA), and ethoxylated trimethylolpropane triacrylate (ETTA).

Specifically, the polyvalent alcohol compound may be at least one selected from the group consisting of mono-, di-, tri-, tetra- or polyethylene glycol, mono propylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol.

In addition, the epoxy compound may be at least one selected from the group consisting of ethylene glycol diglycidyl ether, glycidol, etc., and the polyamine compound may be at least one selected from the group consisting of ethylene diamine, diethylene triamine, triethylene tetramine, tetraethylene pentamine, pentaethylene hexamine, polyethyleneimine, and polyamide polyamine.

Further, examples of the haloepoxy compound may include epichlorohydrin, epibromohydrin and α-methyl epichlorohydrin. Meanwhile, examples of the mono-, di- or polyoxazolidinone compound may include 2-oxazolidinone, etc. In addition, examples of the alkylene carbonate compound may include ethylene carbonate, etc. The above-described compounds may be used alone, respectively, or may be combined with each other. Meanwhile, in order to increase an efficiency of the surface crosslinking process, it is preferred to include at least one polyvalent alcohol compound in the surface crosslinking agents, and more preferably, polyvalent alcohol compounds having a carbon number of 2 to 10 may be used.

In addition, the content of the surface crosslinking agent to be added and mixed so as to surface-treat polymer particles may be appropriately selected depending on specific types or reaction conditions of the surface crosslinking agent to be added. In general, the content of the surface crosslinking agent may be 0.001 to 5 parts by weight, preferably, 0.01 to 3 parts by weight, and more preferably, 0.05 to 2 parts by weight, relative to 100 parts by weight of the polymer.

When the content of the surface crosslinking agent is excessively small, the surface crosslinking reaction is rarely generated, and when the content of the surface crosslinking agent is more than 5 parts by weight relative to 100 parts by weight of the polymer, physical properties of the super absorbent polymer may rather be deteriorated due to the excessive surface crosslinking reaction.

Here, the method of adding the surface crosslinking agent to the polymer is not limited in view of constitution. A method of adding and mixing the surface crosslinking agent and the polymer powder into a reactor or spraying the surface crosslinking agent to the polymer powder, a method of continuously adding and mixing the polymer and the crosslinking agent into a reactor such as a mixer that is continuously operated, etc., may be used.

In addition, according to another exemplary embodiment of the present invention, in order to raise a temperature into a reaction temperature for the surface crosslinking reaction within 1 min to 60 min after the surface crosslinking agent is added, a temperature of the polymer itself may be preferably 20° C. to 80° C. at the time of adding the surface crosslinking agent. In order to have the temperature of the polymer itself as described above, processes to be performed after the drying step to be performed at a relatively high temperature may be continuously performed, and the processing time may be reduced. When it is difficult to reduce the processing time, the polymer may be separately heated.

In addition, in the manufacturing method of the super absorbent polymer according to the present invention, after the surface crosslinking agent is added, the added surface crosslinking agent itself may be heated to raise a temperature into a reaction temperature for the surface crosslinking reaction within 1 min to 60 min.

Meanwhile, when the raising a temperature into the reaction temperature for the surface crosslinking reaction is performed within 1 min to 60 min, and then the surface crosslinking reaction is performed in the manufacturing method of the super absorbent polymer according to the present invention, an efficiency of the surface crosslinking process may be improved, such that a content of the residual monomer of the finally obtained super absorbent polymer may be minimized, and the super absorbent polymer having excellent physical properties may be obtained. Here, a temperature of the surface crosslinking agent to be added may be controlled to be 5° C. to 60° C., and more preferably, 10° C. to 40° C. When the temperature of the surface crosslinking agent is less than 5° C., an effect of decreasing a temperature-raising speed into the surface crosslinking reaction according to the temperature-raising of the surface crosslinking agent may not be significant. When the temperature of the surface crosslinking agent is more than 60° C., the surface crosslinking agent may not be evenly dispersed in the polymer. Throughout the present specification, the reaction temperature for the surface crosslinking reaction may be defined as a total temperature of the surface crosslinking agent and the polymer to be added for the crosslinking reaction.

In addition, temperature-raising means for the surface crosslinking reaction is not limited in view of constitution. Specifically, the raising of the temperature may be performed by supplying heat medium or direct heating by electricity, etc., but the present invention is not limited to the above-described examples. Specific examples of heat sources to be usable may include steam, electricity, ultraviolet rays, infrared rays, etc., and may be a heated thermal fluid, etc.

Meanwhile, in the manufacturing method of the super absorbent polymer according to the present invention, the temperature-raising for the crosslinking reaction is performed, and then, the crosslinking reaction may be performed for 1 min to 60 min, preferably, 5 min to 40 min, and most preferably, 10 min to 20 min. When a crosslinking reaction time is excessively short as less than 1 min, the crosslinking reaction may not be sufficiently performed, and when the crosslinking reaction time is more than 60 min, physical properties of the super absorbent polymer may rather be deteriorated due to the excessive surface crosslinking reaction, and the polymer may be crushed since it remains for a long time in a reactor.

Next, the manufacturing method of the super absorbent polymer according to the present invention may include: d) adding and mixing the inorganic particles having the following characteristics i) and ii) with the super absorbent polymer particles, and then, performing a surface coating reaction of the super absorbent polymer particles:

i) a surface area of the inorganic particles is 90 to 380 $m^2/g$; and ii) a content of the inorganic particles relative to total weight of the super absorbent polymer particles is 0.05 to 0.3 wt %.

More specifically, with respect to the content of the inorganic particles, a method of mixing the inorganic particles with the surface crosslinking agent and spraying and mixing the mixture with the pulverized super absorbent polymer particles (wetting treatment) to perform the surface crosslinking reaction, followed by pulverizing and classifying, and then treating the inorganic particles (silica) in a drying scheme, may be used. The content of the wet or dry inorganic particles (silica), that is, an added amount of total inorganic particles is 0.05 to 0.3 wt %.

Further, in the manufacturing method of the super absorbent polymer, the inorganic particle may be at least one selected from the group consisting of clay, aluminum sulfate, and silica, wherein the inorganic particle is preferably silica.

In addition, the manufacturing method of the super absorbent polymer may include: after step d), measuring gel strength of the super absorbent polymer particles, and selecting the super absorbent polymer particles of which the gel strength is 5000 Pa or more.

A porosity of the super absorbent polymer manufactured by the manufacturing method of the super absorbent polymer according to the present invention is 25% or more. In addition, permeability (Free Swell Gel Bed Permeability: FS GBP) of the super absorbent polymer is 20 darcy or more.

In addition, the present invention may provide the super absorbent polymer manufactured by the manufacturing method of the super absorbent polymer as described above.

EXAMPLES

Hereinafter, although the present invention will be described in more detail through Examples, these Examples of the present invention to be described below are provided by way of example, and a scope of the present invention is not limited to the following Examples. The scope of the present invention is shown in the attached claims of the present invention, and may contain all modifications having the equivalent meaning and scope as the description of the claims. Further, unless otherwise noted, "%" and "part" representing the content in the following Examples and Comparative Examples are on the basis of a mass.

Example: Manufacture of Super Absorbent Polymer

Comparative Example 1

PEGDA (polyethylene glycol diacrylate) 4100 and HDDA (1,6-hexanediol diacrylate) 410 as crosslinking agents, Irgacure 819 (bis(2,4,6-trimethylbenzoyl)-phenyl-phosphineoxide) 80 as a photoinitiator, Sodium persulfate (SPS) 2000 (unit: ppm) as a thermal initiator, and Base resin CRC 36 were used. The surface crosslinking agent had a composition of water 3, Me 3.5, PDO (1,3-Propanediol) 0.3, DM30S 0.01 phr, and Aerosil200 (0.01 wt %) was used as silica.

A monomer aqueous composition having a monomer concentration of 50 wt % was prepared by mixing acrylic acid (100 g), polyethylene glycol diacrylate (0.3 g) and 1,6-hexanediol diacrylate (0.026 g) as the crosslinking agents, diphenyl(2,4,6-trimethylbenzoyl)-phosphine oxide (0.025 g) as the initiator, caustic soda (NaOH) (38.9 g) and water (132.3 g). Then, the monomer aqueous composition was put onto a continuously moving conveyor belt, and irradiated with ultraviolet rays (irradiation amount: 5~11 mW/cm$^2$) to perform UV polymerization for 2 minutes. A hydrogel polymer obtained by the UV polymerization was cut into a size of 5*5 mm and dried in a hot-air dryer at a temperature of 180 to 185° C. for 0.5 to 1 hour, followed by pulverization by a pin mill pulverizer, thereby obtaining a super absorbent polymer having a particle size of 150 to 850 μm by using a sieve. Next, the super absorbent polymer was subjected to a surface crosslinking reaction by using 1,3-propane diol 4% solution, and reacted at 180° C. for 1 hour, followed by pulverization, thereby obtaining a surface-treated super absorbent polymer having a particle size of 150 to 850 μm by using a sieve.

Comparative Example 2

PEGDA (polyethylene glycol diacrylate) 3200 as a crosslinking agent, Irgacure 819 (bis(2,4,6-trimethylbenzoyl)-phenylphosphineoxide) 80 as a photoinitiator, Sodium persulfate (SPS) 2000 (unit: ppm) as a thermal initiator, and Base resin CRC 42 were used. The surface crosslinking agent had a composition of water 4, Me 4, PDO (1,3-Propanediol) 0.22, DM30S 0.01 phr, and Aerosil200 (0.01 wt %) was used as silica.

Comparative Example 3

A super absorbent polymer was obtained by performing the same method as Comparative Example 2 except for performing the surface coating reaction including Aerosil200 (0.1 wt %), as a post treatment.

Example 1

PEGDA (polyethylene glycol diacrylate) 4100 and HDDA (1,6-hexanediol diacrylate) 410 as crosslinking agents, Irgacure 819 (bis(2,4,6-trimethylbenzoyl)-phenylphosphineoxide) 80 as a photoinitiator, Sodium persulfate (SPS) 2000 (unit: ppm) as a thermal initiator, and Base resin CRC 36 were used. The surface crosslinking agent had a composition of water 3, Me 3.5, PDO (1,3-Propanediol) 0.3, DM30S 0.01 phr. Then, a super absorbent polymer was obtained by performing the surface coating reaction including Aerosil200 (0.1 wt %), as a post treatment.

A surface area of the Aerosil200 used as above was 200 m$^2$/g.

Example 2

TEGDA (tetraethylene glycoldiacrylate) 3500 and HDDA (1,6-hexanediol diacrylate) 350 as crosslinking agents, and Sodium persulfate (SPS) 2500 as a thermal initiator were used. As a Redox initiator, $H_2O_2$ 180 (unit: ppm) was used for an oxidizing agent, and Ascorbic acid 500 (unit: ppm) was used for a reducing agent, and Base resin CRC 38 was used. The surface crosslinking agent had a composition of water 4, Me 3, Ex810 0.1 as an epoxy surface crosslinking agent, and DM30S 0.12 phr. Then, a super absorbent polymer was obtained by performing the surface coating reaction including Aerosil200 (0.12 wt %), as a post treatment.

A surface area of the Aerosil200 used as above was 200 m$^2$/g.

Example 3

A super absorbent polymer was obtained by performing the same method as Example 2 except for performing the surface coating reaction including Aerosil200 (0.2 wt %), as a post treatment.

Example 4

PEGDA (polyethylene glycol diacrylate) 4100 and HDDA (1,6-hexanediol diacrylate) 410 as crosslinking agents, Irgacure 819 (bis(2,4,6-trimethylbenzoyl)-phenylphosphineoxide) 80 as a photoinitiator, Sodium persulfate (SPS) 2000 (unit: ppm) as a thermal initiator, and Base resin CRC 36 were used. The surface crosslinking agent had a composition of water 3, Me 3.5, PDO (1,3-Propanediol) 0.3 phr. Then, a super absorbent polymer was obtained by performing the surface coating reaction including Aerosil200 0.1 phr, dry Aerosil200 (0.1 wt %), as a post treatment. A surface area of the Aerosil200 used as above was 200 m²/g.

Physical properties of the super absorbent polymers manufactured by Examples 1 to 4 and Comparative Examples 1 to 3 were shown in Table 1 below.

TABLE 1

|  | CRC (g/g) | AUL (g/g) | Product gel strength (Pa) | Void volume % | FS GBP (darcy) | Note |
|---|---|---|---|---|---|---|
| Comparative Example 1 | 29.6 | 22.0 | 7100 | 21.0 | 12 | Silica 0.01 wt % |
| Comparative Example 2 | 37.0 | 14.8 | 3300 | 1.0 | <1 | Silica 0.01 wt % |
| Comparative Example 3 | 39.0 | 10.6 | 3500 | 23.0 | 14 | Post treatment with Silica 0.1 wt % in Comparative Example 2 |
| Example 1 | 29.6 | 19.7 | 7500 | 40.0 | 96 | Post treatment with Silica 0.1 wt % in Comparative Example 1 |
| Example 2 | 35.0 | 16.0 | 5100 | 25.2 | 23 | Silica 0.12 wt % |
| Example 3 | 35.1 | 13.9 | 5300 | 31.2 | 59 | Post treatment with Silica 0.2 wt % in Example 2 |
| Example 4 | 31.5 | 20.0 | 7300 | 34.2 | 68 | Silica 0.2 wt % |

Experimental Example: Evaluation of Physical Properties

The following tests were conducted to evaluate physical properties of the super absorbent polymers according to Examples 1 to 4 and Comparative Examples 1 to 3.

Experimental Example 1: Retention Capacity (CRC, Centrifugal Retention Capacity)

Retention capacity (CRC, centrifugal retention capacity) of each of the super absorbent polymers prepared by Examples 1 to 4 and Comparative Examples 1 to 3 was measured. The retention capacity was measured on the basis of EDANA method WSP 241.3. Each sample (0.2 g) that had a particle size of 150 to 850 μm or that was pre-classified in the prepared super absorbent polymers was put into a tea bag, and precipitated into 0.9% brine solution for 30 minutes. Then, dehydration was performed for 3 minutes by 250 G (gravity) of centrifugal force, and an amount at which the brine solution was absorbed was measured.

Experimental Example 2: Absorption Under Load (AUL)

Absorption Under Load (AUL) of each of the super absorbent polymers prepared by Examples 1 to 4 and Comparative Examples 1 to 3 was measured. The absorption under load (AUL) was measured on the basis of EDANA method WSP 242.2. Each sample (0.9 g) that had a particle size of 150 to 850 μm or that was pre-classified in the prepared super absorbent polymers was put into a cylinder defined by EDATA, pressure (0.9 psi) was applied by using a piston and weights, and then, an amount at which 0.9% brine solution was absorbed for 60 minutes was measured.

Experimental Example 3: Measuring Method of Gel Strength

Gel strength of each of the super absorbent polymers prepared by Examples 1 to 4 and Comparative Examples 1 to 3 was measured. This experiment for measuring gel strength was performed at room temperature. In order to prepare a sample, a final product sample was mixed with brine (0.9 wt %) at a mass ratio of 1:100, followed by swelling for 1 hour. After that, extra brine was removed through aspiration, and brine remaining on a surface of the swollen sample was removed, and then gel strength was measured by using a stress type rheometer measuring equipment using a parallel plate with a diameter of 25 mm.

Experimental Example 4: Measuring Method of Porosity

Porosity of each of the super absorbent polymers prepared by Examples 1 to 4 and Comparative Examples 1 to 3 was measured. The super absorbent polymer (2 g) was put into a cylinder and swollen in brine (0.9 wt %) for 30 minutes, and dehydrated by a centrifuge. Then, a height and a mass of a gel bed were measured. Then, porosity was calculated by using Equation 1 below.

$$\text{Swollen SAP density} = \frac{W' - W}{A \times (H' - H)} \quad \text{[Equation 1]}$$

W' Mass of (Cylinder+Gel Bed) after dehydration
W Mass of Initial blank cylinder
H' Height of Gel Bed after dehydration
H Height of Initial blank cylinder
A Area of Cylinder floor Void volume %=(1−Swollen SAP density)×100

It could be confirmed from the results of Table 1 above that the super absorbent polymer having a surface coated with inorganic particles allowed to cause friction between surfaces of the gel particles, and to form a large number of voids, thereby having remarkably increased porosity as compared to Comparative Examples 1 and 2 without including the inorganic particles.

In addition, it could be confirmed that Examples 1 to 4 of which the gel strength of each of the super absorbent polymers was 5000 Pa or more could more favorably maintain the shapes of the packed gel particles, thereby forming a large number of voids between particles, and as a result, the porosity of the super absorbent polymer was increased, as compared to Comparative Examples 2 and 3 of which the gel strength was less than 5000 Pa.

It could be confirmed from the above results that the improvement of the gel strength, and the surface coating of the inorganic particulates such as silica, etc., simultaneously acted in a multiple way, such that the porosity of the super absorbent polymer of the present invention could be remarkably increased, and as a result, excellent permeability (Free Swell Gel Bed Permeability: FS GBP) could be implemented.

In the present invention, FIG. 1 is a graph showing a correlation between porosity and permeability (Free Swell Gel Bed Permeability: FS GBP) of super absorbent polymers manufactured by Examples 1 to 4 and Comparative Examples 1 to 3, wherein as the porosity was increased, the permeability (Free Swell Gel Bed Permeability: FS GBP) was also increased in direct proportion relationship.

According to the results of the present invention, the super absorbent polymer (SAP) appropriate for being used as a diaper having a high ratio of the super absorbent polymer (SAP)/core had a porosity of 25% or more and FS GBP of 20 darcy or more, and herein, when the gel strength of the SAP was 5000 Pa or more, and the content of the inorganic particles such as silica, etc., relative to total weight of the super absorbent polymer particles was 0.05 to 0.3 wt %, the above-described physical properties could be implemented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A super absorbent polymer comprising:
   super absorbent polymer particles and
   silica coated on a surface of the super absorbent polymer particles, wherein
   i) a surface area of the silica is 90 to 380 $m^2/g$; and
   ii) a content of the silica relative to total weight of the super absorbent polymer particles is 0.05 to 0.3 wt %,
   wherein the super absorbent polymer has a gel strength of 5000 Pa to 7500 Pa, a porosity of 25% or more, and a free swell gel bed permeability (FS GBP) of 20 darcy or more.

2. A manufacturing method of the super absorbent polymer of claim 1 comprising:
   a) preparing a hydrogel polymer by thermal polymerizing or photopolymerizing a monomer composition including a water-soluble ethylenically unsaturated monomer and a polymerization initiator;
   b) drying the hydrogel polymer;
   c) pulverizing the dried hydrogel polymer to obtain super absorbent polymer particles; and
   d) adding and mixing silica having the following characteristics i) and ii) with the super absorbent polymer particles, and then, performing a surface coating reaction of the super absorbent polymer particles:
   i) a surface area of the silica is 90 to 380 $m^2/g$; and
   ii) a content of the silica relative to total weight of the super absorbent polymer particles is 0.05 to 0.3 wt %.

3. The manufacturing method of claim 2, wherein:
   after step d), a gel strength of the super absorbent polymer is measured, and then, the super absorbent polymer of which the gel strength is 5000 Pa or more are selected.

4. The manufacturing method of claim 2, further comprising:
   before the drying of step b), pulverizing the hydrogel polymer into a particle size of 1 mm to 15 mm.

5. The manufacturing method of claim 2, wherein:
   the drying of step b) is performed at a temperature of 150° C. to 250° C.

6. The manufacturing method of claim 2, further comprising:
   before the surface coating reaction of step d), adding and mixing a surface crosslinking agent with the super absorbent polymer particles, and then, performing a surface crosslinking reaction of the super absorbent polymer particles.

7. The manufacturing method of claim 6, wherein:
   the surface crosslinking agent is at least any one selected from the group consisting of multifunctional acrylate-based compounds; polyvalent alcohol compounds; epoxy compounds; polyamine compounds; haloepoxy compounds; condensation products of haloepoxy compounds; oxazoline compounds; mono-, di- or polyoxazolidinone compounds; cyclic urea compounds; polyvalent metal salts; and alkylene carbonate compounds.

8. The manufacturing method of claim 6, wherein:
   the surface crosslinking agent has an amount of 0.001 to 5 parts by weight relative to 100 parts by weight of the super absorbent polymer particles.

9. The manufacturing method of claim 6, wherein:
   the surface crosslinking reaction is performed for 1 to 60 min.

10. The manufacturing method of claim 6, wherein:
    the surface crosslinking reaction is performed by irradiation of at least any one selected from heat sources consisting of steam, electricity, ultraviolet rays, and infrared rays so as to raise a temperature.

11. The manufacturing method of claim 2, wherein:
    a permeability (Free Swell Gel Bed Permeability: FS GBP) of the super absorbent polymer is 20 darcy or more.

12. A super absorbent polymer manufactured by the manufacturing method of a super absorbent polymer of claim 2.

* * * * *